April 20, 1943.      P. PAPPAS      2,317,214
COFFEE MAKING APPARATUS
Filed Oct. 31, 1941      2 Sheets-Sheet 1

Inventor
Peter Pappas
By Rockwell Bartholow
Attorneys

April 20, 1943.   P. PAPPAS   2,317,214
COFFEE MAKING APPARATUS
Filed Oct. 31, 1941   2 Sheets-Sheet 2

Inventor
Peter Pappas
By
Attorneys

Patented Apr. 20, 1943

2,317,214

UNITED STATES PATENT OFFICE 2,317,214

COFFEE-MAKING APPARATUS

Peter Pappas, New Haven, Conn.

Application October 31, 1941, Serial No. 417,263

7 Claims. (Cl. 53—3)

This invention relates to coffee-making apparatus, and more particularly to an apparatus of this character for use in restaurants or other places where large quantities of coffee are to be made. Such apparatus usually includes means for heating the water from which the coffee is made, and also means for keeping the prepared coffee hot after it has been made and before it is served.

One object of the present invention is the provision of coffee-making apparatus of improved construction and appearance.

A further object of the invention is the provision of coffee-making apparatus which may be operated by the use of a single burner or single source of heat, and which nevertheless may be so efficiently operated as to maintain a sufficient supply of boiling water for coffee-making purposes, and at the same time keep the prepared coffee at a high temperature, near to or at the boiling point, so that it will always be ready to serve.

Another object of the invention is the provision of a coffee-making apparatus which will be of relatively simple construction, and have relatively few connections so that danger of leakage is kept to a minimum, and which at the same time may be operated with a minimum of labor.

To these and other ends the invention consists in the novel features and combinations of parts to be hereinafter described and claimed.

In the accompanying drawings:

Fig. 5 is a sectional view on line 5—5 of Fig. 3; and

Figure 1:
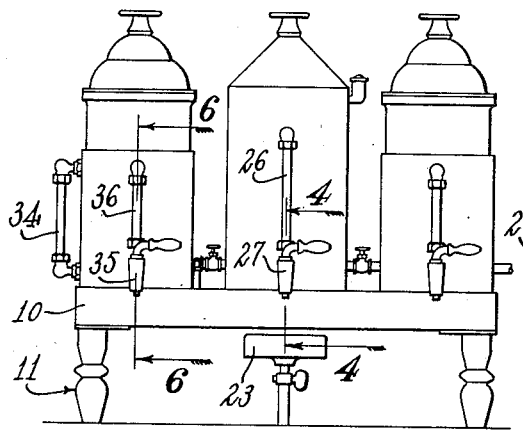
Fig. 1 is a front plan view of a coffee-making apparatus embodying my invention.
Figure 4:
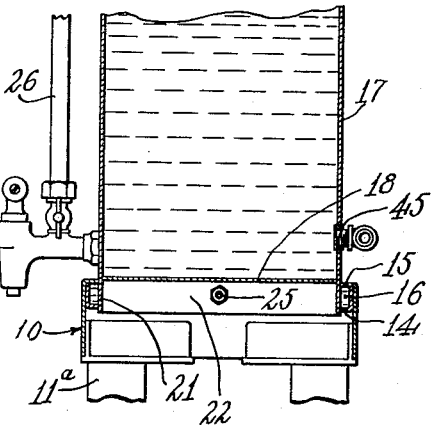
Fig. 4 is a sectional view on line 4—4 of Fig. 1.
Figure 3:
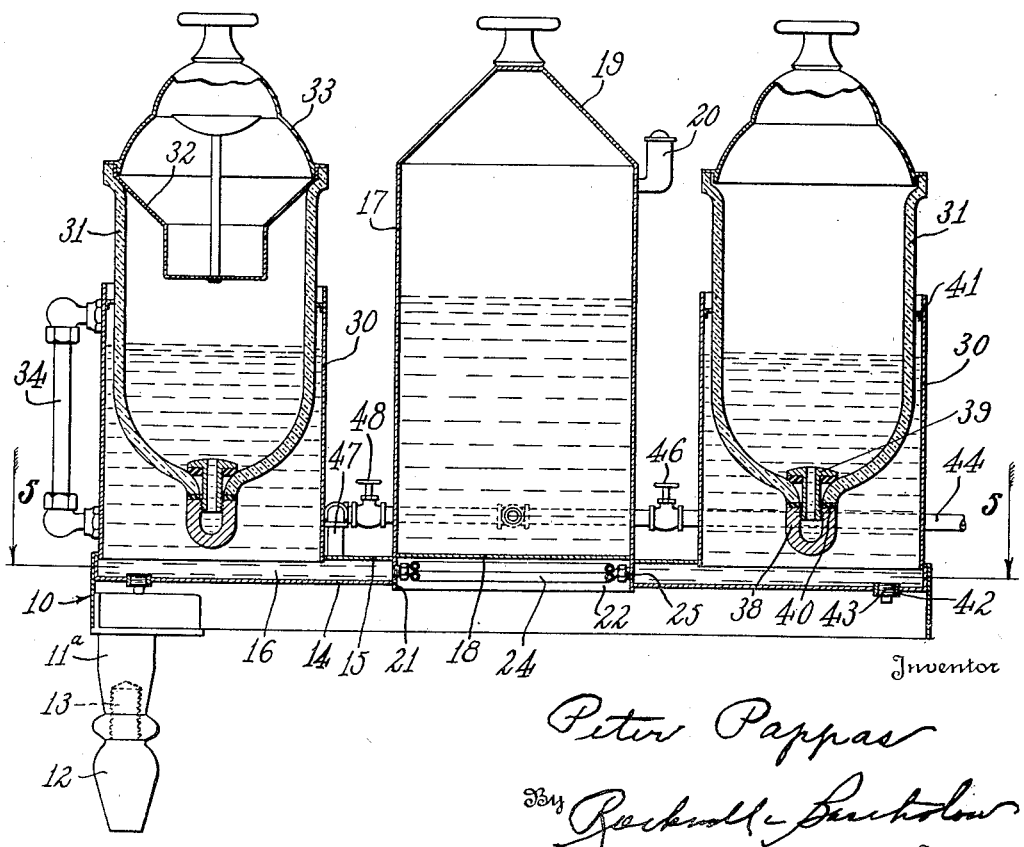
Fig. 3 is a sectional view on line 3—3 of Fig. 2.
Figure 2:
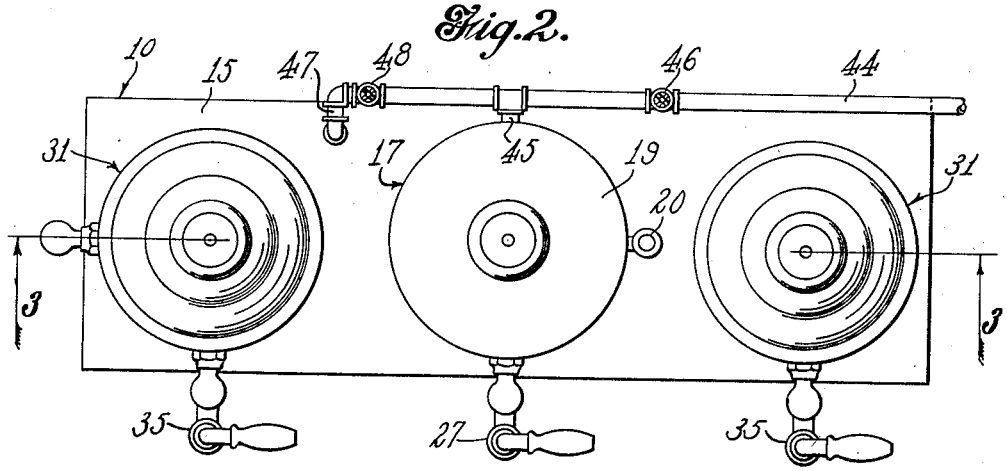
Fig. 2 is a plan view of the same.
Figure 3:
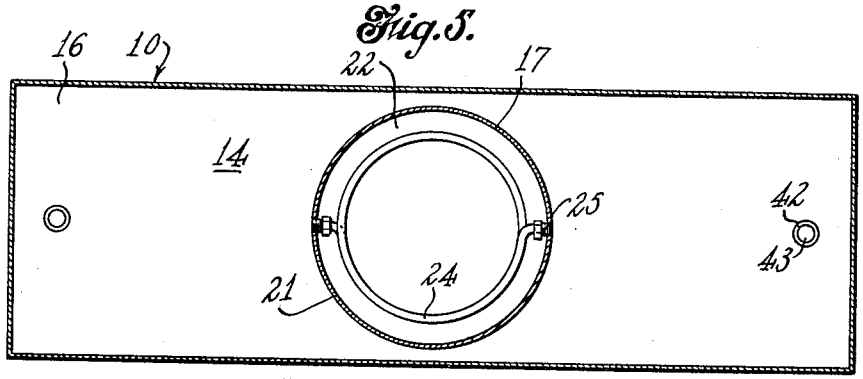
Figure 6:
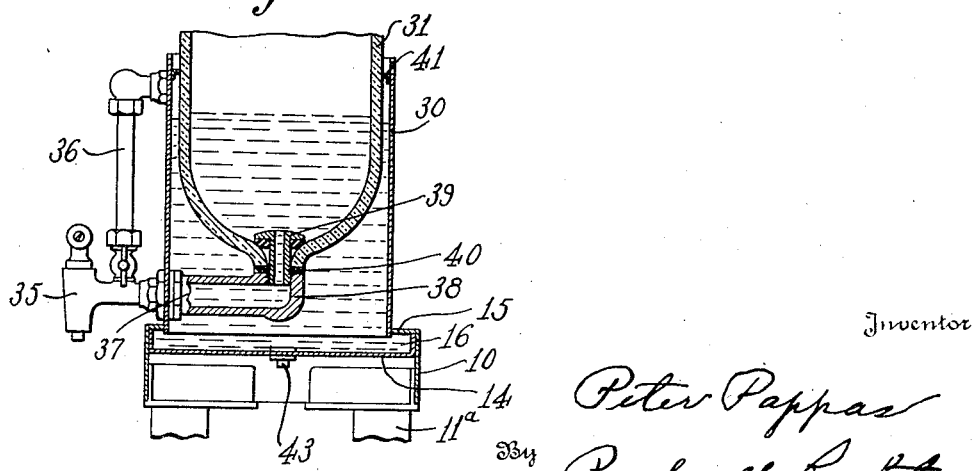
Fig. 6 is a sectional view on line 6—6 of Fig. 1.

To illustrate a preferred embodiment of my invention I have shown in the drawings a coffee-making apparatus comprising a table having a horizontally extending table top designated generally by the numeral 10, which top may be supported upon legs 11 at its four corners, the table, as shown more especially in Figs. 2 and 5, being illustrated as generally rectangular in shape. As shown in Fig. 3, it will be noted that the lower portion 12 of each of the legs is threadedly secured to the upper portion 11a, as indicated at 13, so that the lower portion of the legs may be adjusted by rotation thereof in order that the table may rest evenly upon a counter or other support.

The table top 10 comprises a lower member 14 and an upper member 15, these two members or walls being spaced apart so as to provide therebetween a water chamber 16, which chamber, as shown particularly in Fig. 5, extends for the entire length of the table. As shown, the apparatus comprises a boiler or water-heating device substantially centrally disposed upon the table top, and a coffee urn disposed upon each side of the boiler. It will be understood that the two coffee urns are identical in construction, and the description of one thereof will suffice for the other. If a plurality of such urns are unnecessary for the amount of coffee which is to be made, one only of these urns may be employed, but in the usual case they are used alternately, the coffee being prepared in one while it is being used from the other.

As illustrated, the boiler comprises side walls 17, a bottom member 18, and a top 19. Also it may be provided with a safety valve 20 to permit the escape of steam if the pressure within the boiler becomes excessive. As shown, the bottom 18 of the boiler is at substantially the same level as the upper side 15 of the table top, and the side walls 17 of the boiler extend downwardly through the water chamber, as shown at 21, so as to expose from below the lower side of the bottom member 18 and to provide an air space at 22 below the member 18 within the horizontal outline of the water chamber.

As shown in Fig. 5, the boiler is of less diameter than the width of the table top, so that, while the side walls of the boiler project through the water chamber and shut off the water therein from the air space 22, the water in this chamber surrounds the lower portion of the side walls of the boiler and surrounds the air space, the two ends of the water chamber upon each side of the boiler communicating at the opposite sides of the latter. A burner 23 may be supported below the air space 22, and, as will be apparent, the flame from this burner will impinge against the bottom 18 of the boiler to heat the water in the latter, and heat from the burner will also be carried to the water in the chamber 16 through the walls 21 around the air space 22, so that the single burner will serve to heat the water in the boiler and also the water in the chamber 16.

If desired, a heating coil 24 may be positioned within the air space 22 to be above the burner 23 so that the flame from the burner will impinge on the coil and heat water therein. The ends of this coil may, as shown at 25, extend through the walls 21 of the boiler and communicate with the water chamber 16 so that the water from this chamber will circulate through the coils and be heated in this manner, as well as by heat directly from the burner 23. If desired, the ends of the coil 24 may be connected to some other device, such as a steam table, for example, so that the same burner may not only be employed for the coffee-making apparatus shown, but may also be employed for additional apparatus.

The boiler may be provided with a gauge 26 to indicate the height of the water therein, and a faucet 27 through which water may be drawn from the boiler to be employed in making the coffee.

Upon each side of the boiler the upper side 15 of the table top is provided with relatively large openings, and in these openings are seated the lower ends of the side walls of coffee urns 30, these urns being bottomless so that they open into the water chamber 16 and water from the latter rises therein. Within the urns 30 are supported coffee pots 31, preferably formed of glass or some transparent material. In the usual form the urns 30 will be made of sheet metal, and it will be noted that the coffee pots 31 rise above the urns 30 to a considerable extent so that an observer may view the coffee in the pots 31 through their projecting transparent walls. Adjacent the top of the urn 31 is supported the usual coffee basket 32, above which is the cover 33.

The urn 30 may be provided with a water gauge 34 to indicate the height of the water therein, and it will be noted that only one of these gauges is necessary for both of the coffee urns, as the water will stand at the same level in both, the two urns being in free communication through the water chamber 16. Each of the urns 31 is also provided with a faucet 35 and a coffee gauge 36. The pipe 37 extends from the faucet 35, from which the prepared coffee is drawn, into the urn 30, and is provided at its inner end with a chambered or socket-like member 38 upon which the lower reduced end of the coffee pot 31 rests. The latter may be secured to the member 38 by means of the sleeve nut 39 threaded into the member 38, the joint being made watertight by means of the gasket 40 between the member 38 and the lower end of the pot 31. Also assisting in supporting the pot 31 and centering it in the urn 30 is an inwardly projecting flange 41 adjacent the upper end of the urn.

The lower side 14 of the table top may be provided with drainage openings 42 normally closed by screw plugs 43 to provide for the drainage of the water from the table when desired. As shown more especially in Figs. 2 and 3, a pipe 44 leading from a source of city water supply is provided with a branch 45 leading into the boiler whereby the latter may be filled under control of the valve 46. The pipe 44 also, as shown at 47, communicates with the water chamber 16 in the table top, and is provided with a second manually operable valve 48 between this connection and the boiler connection 45.

In using the apparatus the valve 46 is opened, the valve 48 closed, and water in the desired amount is supplied to the boiler. This is heated by the flame from the burner 23, and thereafter the valve 48 will be opened and permit hot water from the boiler to pass into the water chamber 16. If necessary, after the water chamber 16 has been filled to the desired amount, including the communicating urns 30, the valve 46 may be again opened to supply cold water to the boiler. It will, of course, be understood that it would usually be desirable upon starting the apparatus to supply some water to the water chamber 16 as well as in the boiler, but after the device is in operation the supply of water in the water chamber 16 and urns 30 will be replenished from the hot water in the boiler under control of the valves 46 and 48.

Also it may be observed that the water in the boiler is closed from communication from that in the urns 30, so that the boiler water, which is replenished from time to time, will be that employed for preparing the coffee. When the boiler water is sufficiently hot, the desired quantity thereof may be drawn through the faucet 27 and poured over the coffee grounds in the coffee basket 32 to make a supply of coffee in the pot 31. As shown, this is a manual operation, although if desired a pipe may be provided to convey the water from the boiler to the coffee pot.

It will be apparent that, while the apparatus disclosed has the appearance of the ordinary coffee-making apparatus, it is nevertheless provided with the hollow table top providing the water chamber 16, whereby the water in the urns may be heated from the same flame as that in the boiler, without the necessity of numerous connecting pipes between the vessels. Also the water in the boiler is kept separate from that which keeps hot the coffee in the urns 30, so that the boiler water, which is comparatively fresh, will be used exclusively for coffee-making purposes. Moreover, the water in the urns 30, which communicate with each other through the water chamber in the table top, may be replenished through the single connection 47 from the hot water in the boiler by opening the valve 48, so that this one connection will take care of both of the urns.

While I have shown and described a preferred form of my invention, it will be understood that it is not to be limited to all of the details shown, but is capable of modification and variation within the principles of the invention and within the scope of the claims.

What I claim is:

1. A coffee-making apparatus, comprising a table having a shallow hollow top providing a water chamber, a bottomless urn supported on the upper member of the table top whereby its interior communicates freely with said chamber, a boiler supported upon the table beside the urn, the side walls of the boiler extending downwardly through the table top to be surrounded by the water chamber and expose the bottom of the boiler from below the table, and a single means for supplying heat to said chamber and to the lower exposed side of the boiler bottom between the side walls of the latter.

2. A coffee-making apparatus, comprising a table having a hollow top providing a water chamber, a bottomless urn supported on the upper member of the table top whereby its interior communicates freely with said chamber, a boiler supported upon the table beside the urn, the side walls of the boiler extending downwardly through the table top to be surrounded by the water chamber and expose the bottom of the boiler from below the table, and a single means for supplying heat to said chamber and to the lower exposed side of the boiler bottom between the side walls of the latter, the bottom of the boiler lying above the lower level of the water chamber, and a coil disposed below the boiler and within the outline of the chamber.

3. A coffee-making apparatus, comprising a table having a horizontally disposed hollow top providing a water chamber, an urn supported by the table, said urn being in free communication at its bottom with the water chamber to permit water in the latter to rise in the urn, a boiler supported by the table and having side walls and a bottom closing off communication between it and the water chamber, partition means projecting downwardly below the boiler bottom through the water chamber to provide an air space surrounded by the water chamber and expose the boiler bottom from below the chamber within said air space, whereby heat may be supplied to said space to heat both the boiler water and the chamber water, and a heating coil in said space below the boiler bottom, the ends of said coil being in communication with the water chamber to permit the water in the latter to circulate through the coil.

4. A coffee-making apparatus, comprising a table having a horizontally disposed hollow top providing a water chamber, an urn supported by the table, said urn being in free communication at its bottom with the water chamber to permit water in the latter to rise in the urn, a boiler supported by the table and having side walls and a bottom closing off communication between it and the water chamber, partition means projecting downwardly below the boiler bottom through the water chamber to provide an air space surrounded by the water chamber and expose the boiler bottom from below the chamber within said air space, whereby heat may be supplied to said space to heat both the boiler water and the chamber water, and connections between the boiler and said chamber to deliver water from the former to the latter.

5. A coffee-making apparatus, comprising a table having a horizontally disposed hollow top providing a water chamber, an urn supported by the table, said urn being in free communication at its bottom with the water chamber to permit water in the latter to rise in the urn, a boiler supported by the table and having side walls and a bottom closing off communication between it and the water chamber, partition means projecting downwardly below the boiler bottom through the water chamber to provide an air space surrounded by the water chamber and expose the boiler bottom from below the chamber within said air space, whereby heat may be supplied to said space to heat both the boiler water and the chamber water, and a heating coil in said space below the boiler bottom, the ends of said coil being in communication with the water chamber.

6. A coffee-making apparatus, comprising a table having spaced upper and lower sides to provide a horizontally disposed water chamber therebetween, the upper side of said chamber being provided with an opening, an urn supported on the table and having its walls rising from said opening whereby the water chamber closes said urn at its bottom, a boiler supported by the table beside the urn and closed from communication with the chamber, the side walls of said boiler extending downwardly through the chamber to be surrounded by the water therein, and the bottom of the boiler being disposed above the lower side of the table to provide an air space between the boiler walls, and a burner disposed below said space to supply heat both to said boiler and said chamber.

7. A coffee-making apparatus, comprising a table having spaced upper and lower sides to provide a horizontally disposed water chamber therebetween, the upper side of said chamber being provided with an opening, an urn supported on the table and having its walls rising from said opening whereby the water chamber closes said urn at its bottom, a boiler supported by the table beside the urn and closed from communication with the chamber, the side walls of said boiler extending downwardly through the chamber to be surrounded by the water therein, and the bottom of the boiler being disposed above the lower side of the table to provide an air space between the boiler walls, a burner disposed below said space to supply heat both to said boiler and said chamber, and a heating coil in said air space having its ends opening into the water chamber.

PETER PAPPAS.